United States Patent [19]

Williams

[11] Patent Number: 4,885,575
[45] Date of Patent: Dec. 5, 1989

[54] METHOD AND MEANS OF DISPLAYING INFORMATION

[76] Inventor: Leon G. Williams, 467 Portland Ave., St. Paul, Minn. 55102

[21] Appl. No.: 607,548

[22] Filed: May 7, 1984

[51] Int. Cl.⁴ .............................................. G09G 3/00
[52] U.S. Cl. ...................................... 340/712; 341/23
[58] Field of Search ........ 340/712, 715, 722, 365 VL, 340/709, 753, 754, 825.19; 341/23

[56] References Cited

U.S. PATENT DOCUMENTS

| | | | |
|---|---|---|---|
| 3,897,722 | 4/1975 | Knowlton | 340/324 R |
| 4,001,807 | 1/1977 | Dallimonti | 340/722 |
| 4,078,257 | 3/1978 | Bagley | 364/900 |
| 4,121,204 | 10/1978 | Welch et al. | 340/712 |
| 4,124,843 | 11/1978 | Bramson | 340/337 |
| 4,247,851 | 1/1981 | Hall | 340/715 |
| 4,274,081 | 6/1981 | Nomura et al. | 340/153 |
| 4,280,121 | 7/1981 | Crask | 340/365 |
| 4,303,973 | 12/1981 | Williamson, Jr. et al. | 340/722 |
| 4,326,193 | 4/1982 | Markley et al. | 340/365 R |
| 4,333,097 | 6/1982 | Burick et al. | 340/711 |
| 4,376,993 | 3/1983 | Freeman | 368/188 |
| 4,413,314 | 11/1983 | Slater et al. | 340/722 |

OTHER PUBLICATIONS

Bigbie, et al., IBM Technical Disclosure Bulletin, Programmable Key/Display/Switch Device, vol. 21, No. 2, pp. 442-444, Jul. 1978.
Gelb, et al., IBM Technical Disclosure Bulletin, Variable-Read Keyboard, vol. 15, No. 12, p. 3597, May 1973.
Cummings, IBM Technical Disclosure Bulletin, Variable Keyboard for Terminal Displays, vol. 16, No. 2, pp. 575-576, Jul. 1973.

Primary Examiner—David K. Moore
Assistant Examiner—M. Fatahiyar
Attorney, Agent, or Firm—William T. Udseth; John G. Shudy, Jr.

[57] ABSTRACT

Reprogrammable or softkeys are employed in a manner allowing significant flexibility in the display of information on a computer display means. Areas on the display corresponding to the softkeys are used to display the possible set of values of a parameter characterizing a function of a system or apparatus. Subsets of the set of values can also be displayed. Additionally, different variables can be displayed at the same location of the display at different times. The softkeys are further adapted to alter the state of the system or apparatus by affecting the parameter associated with each softkey when that softkey is activated in accordance with a prescribed pattern.

6 Claims, 1 Drawing Sheet

METHOD AND MEANS OF DISPLAYING INFORMATION

BACKGRROUND OF THE INVENTION

1. Field of the Invention

This invention relates to keyboard/display assemblies wherein the keys of the keyboard are "softkeys", i.e., the keys are reprogrammable so that one key can represent a plurality of functions.

2. Prior Art

Prior softkey keyboard/display assemblies have utilized softkeys in a limited fashion. Typically a softkey will control a single function, e.g., turn on a light. By activating the key the light is turned on and by activating the key again the light is turned off. The key can be reprogrammed and relabeled to perform a different function.

This above prior mode of employing softkeys adds substantial flexibility to keyboards as commpared to keyboards where the keys cannot be reprogrammed. However, additional flexibility in the display of information concerning the state of a system or device would greatly enhance the monitoring and control of such system or device.

SUMMARY OF THE INVENTION

The present invention employs reprogrammable keys (i.e., softkeys) to display a variety of information about a system. Areas on a display corresponding to a softkey on a keyboard are utilized to display the set of possible values or states—whether continuous or discrete—of a function or parameter. In addition, the particular parameter associated with a key can be varied and/or the set of possible values of that parameter can be altered. Further, the softkeys can be employed to alter the state of the associated parameter and thereby affect the state of a system or device.

DESCRIPTION OF THE PREFERRED EMBODIMENT

Figure 1:
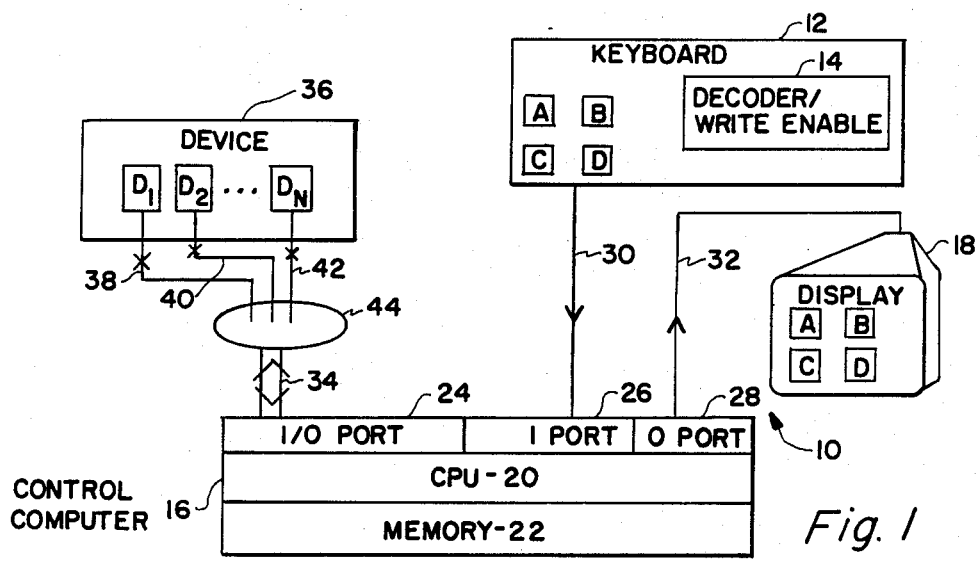
FIG. 1 is a device for implementing the present invention.

Device 10 in FIG. 1 includes a keyboard 12 (including keys or switches A, B, C and D, standard keyboard components, as well as decoder/write enable 14), control computer 16 and display 18. Control computer 16 typically includes CPU 20 and memory 22. Control computer 16 conveniently includes input/output port 24, input port 26 and output port 28. Data transmission bus 30 provides access between keyboard 12 and control computer 16. Data transmission bus 32 provides access between control computer 16 and display 18. Bidirectional data transmission bus 34 provides for data transmission between control computer 16 and a device 36 to be monitored or controlled by device 10.

Device 36 preferably includes detector/controllers $D_1, D_2 \ldots D_N$. Detectors/controllers $D_1 \ldots D_N$ are each adapted to detect and/or control different functions of device 36. Each functionn of device 36 will, for convenience, be assumed to be represented by a single parameter. The parameter associated with each detector/controller will have a like numbered subscript, for example parameter $p_1$ corresponds to detector/controller $D_1$.

Further bidirectional data transmission buses 38, 40 and 42 are provided so that each detector/controller communicates with interface 44 where data transmission buses 38, 40 and 42 are coupled to bidirectional data transmission bus 34.

In operation, memory 22 includes data identifying a unique area on display 18 associated with each key A, B, C and D. In FIG. 1, the area associated with each key is labeled with the same letter. Control computer 16 provides eac display area with the current status of one of the parameters $p_1 \ldots p_n$ as determined by $D_1 \ldots D_N$. Memory 22 further includes a possible set of values, whether discrete or continuous, for each parameter $p_1 \ldots p_n$. Control computer 16 displays the possible set of values for each parameter $p_1 \ldots p_n$ (or some selected subset thereof) at the unique display area associated with that particular parameter. For example, if display area A is associated with $p_1$, the set of possible values of $p_1$ is displayed within area A in addition to the current value of parameter $p_1$.

Further, control computer 18 is adapted to allow the parameter corresponding to any key to be altered by, for example, activation of decoder/write enable 14. Decoder/write enable 14 could be activated allowing the keys of keyboard 12 to now write selected data into memory 22 which in turn could be transmitted along data bus 34 to the appropriate detector/controller which would in turn alter the parameter associated with that particular detector/controller. Similarly, different portions of the set of possible values for a parameter $p_x$ can be selected by adapting keyboard 12 and control computer 16 to allow reduction or expansion of the range of values displayed or the selection of some defined subset of the set of values.

Device 10 is preferrably further adapted to allow an operator to switch the assignment of parameters to keys on keyboard 12, and correspondingly, the assignments to the display areas on display 18. Similarly, device 10 could simply employ only some of the keys on keyboard 12 at one time and thus only the areas on display 18 corresponding to the keys utilized would be employed at that time.

Figure 2A:
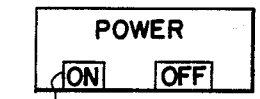
FIGS. 2A-2D are examples of information displayed in accordance with the present invention.

FIGS. 2A-2D show some possible displays of data on display 18 in accordance with the present invention. FIG. 2A simply indicates a function with two different states. The softkey corresponding to the area of display 18 displaying the data of FIG. 2A is adapted to switch the function between states upon activation of the associated key.

Figure 2B:
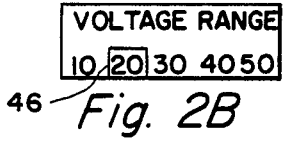
Figure 2C:
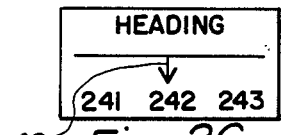
Figure 2D:
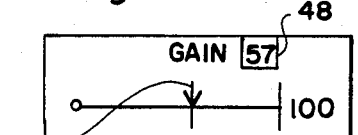

FIG. 2B shows data displayed where the selection is among discrete values. FIGS. 2C and 2D show data displayed where the selection is amongst continuous values. In FIGS. 2A-2B a cursor 46 is conveniently utilized to indicate the current status of the parameter displayed. As described above, device 10 is preferably adapted to allow an operator to move cursor 46 and to thereby affect the parameter displayed. In FIG. 2D, a further embellishment includes a digital display at site 48 with the current value of a parameter as cursor 46 is moved along a continuum.

FIGS. 2A-2D are of course not exhaustive of the types of data which may be displayed within display areas A, B, C and D on monitor 18. Text, symbols or graphics may be employed in the present invention.

Figure 3:
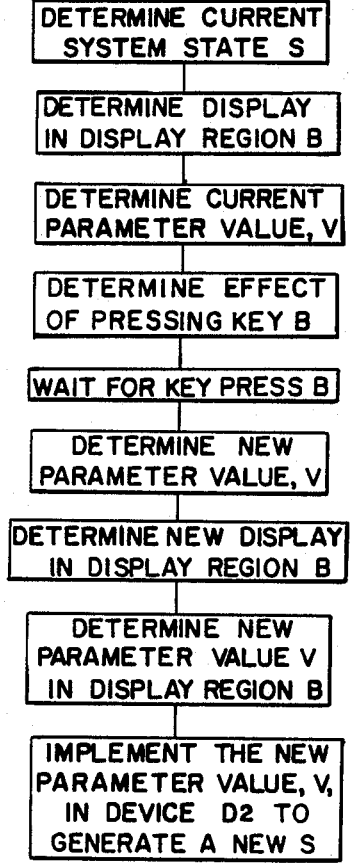
FIG. 3 is a flow diagram of one method of accomplishing one embodiment of the present invention.

FIG. 3 shows a flow chart of one possible process employed within control computer 16 to alter a portionn of display 18 so that different discrete values of a particular parameter, such as a voltage, are displayed at two different times in one of the display areas. Pressing a softkey in the present invention will affect the information on display 18 in a manner specific to the current display.

The present invention allows significant flexibility in the display of data. The locations on display 18 where different parameters can be displayed can be readily interchanged, different parameters can be displayed at different locations on display 18 at the same time or different parameters can be displayed at the same location on display 18 at different times.

It will be evident to those skilled in the art that the method of the present invention can be accomplished by a variety of means using a variety of software to correlate display 18 with the desired information. For example, control computer 16 need not be a digital computer but could be an analog computer depending on the applications to which the method of the present invention would be put to and the desires of the operator.

What is claimed is:

1. A device for displaying information comprising:
   means for inputting data by activating a switch;
   means for storing current values of first and second parameters of a system or apparatus, and for storing the possible values of each of said parameters;
   means for selecting either said first or said second parameter as the parameter to be displayed in response to activating said switch;
   means for retrieving from said means for storing, said possible values of the one of said parameters selected by said means for selecting; and
   means for displaying said one of said parameters selected by said means for selecting and said possible values of said one of said parameters, wherein said one of said parameters and said possible values of said one of said parameters are displayed at the same location on said means for displaying irrespective of which of said parameters is selected.

2. The device of claim 1 being further adapted to alter the current value of said first parameter by a second activation of said switch.

3. A device for displaying information, comprising:
   means for inputting data by activating a switch;
   means for storing the current value of a parameter of a system or apparatus and for storing first and second sets of possible values of said parameter, wherein said second set contains at least one value not included in said first set;
   means for retrieving from storage either said first or said second set of possible values as the set to be displayed in response to activating said switch; and
   means for displaying said parameter and the one of said first or second set of possible values retrieved by said retrieving means, wherein said parameter and said one of said first or second set of possible values are displayed at the same location on said means for displaying irrespective of which of said sets of possible values is selected.

4. The device of claim 3 being further adapted to alter the current value of said first parameter by a second activation of said switch.

5. A method of displaying information in an interctive keyboard and display assembly, comprising:
   assigning a unique location on said display corresponding to one of the keys of said keyboard;
   at a first time, displaying a plurality of possible values of a first variable representing a first parameter of a system or apparatus at said unique location in response to a first activation of said key;
   at a later time, displaying a plurality of possible values of a second parameter of said system or said apparatus at said unique location in response to a further activation of said key; and
   at an intermediate time between said first and later times, changing the plurality of possible values of the first variable representing said first parameter by another activation of said key.

6. A method of displaying information in an interactive keyboard and display assembly, comprising:
   assigning a unique locationn on said display corresponding to one of the keys of said keyboard;
   at a first time, displaying a first set of possible values of a parameter of a system or apparatus at said unique location;
   at a later time, displaying a second set of possible values of said parameter at said unique location, wherein at least one value of said second set is not included in said first set; and
   at an intermediate time between said first and later times, changing the value of the first set of possible values of said parameter by activating said key.

* * * * *

UNITED STATES PATENT AND TRADEMARK OFFICE
CERTIFICATE OF CORRECTION

PATENT NO. : 4,885,575
DATED : December 5, 1989
INVENTOR(S) : Leon G. Williams

It is certified that error appears in the above-identified patent and that said Letters Patent is hereby corrected as shown below:

Column 4, line 19, cancel "interctive" and substitute

--interactive--

Column 4, line 37, cancel "locationn" and substitute

--location--.

Signed and Sealed this

Fifth Day of February, 1991

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,885,575
DATED : December 5, 1989
INVENTOR(S) : LEON G. WILLIAMS

It is certified that error appears in the above-identified patent and that said Letters Patent is hereby corrected as shown below:

On the title page, Item [73]:

--Assignee: Honeywell Inc., Minneapolis, Minnesota--

Column 1, line 66, cancel "functionn" and substitute --function--;

Column 2, line 13, cancel "eac" and substitute --each--;

Column 3, lines 2 and 3, cancel "por-tionn" and substitute --portion--.

Signed and Sealed this

Twenty-ninth Day of June, 1993

Attest:

MICHAEL K. KIRK

Attesting Officer     Acting Commissioner of Patents and Trademarks